United States Patent
Choi

(10) Patent No.: US 6,804,516 B2
(45) Date of Patent: Oct. 12, 2004

(54) INFORMATION SYSTEM FOR A TRAVELER INFORMATION SERVICE AND METHOD FOR PROVIDING THE SERVICE

(75) Inventor: Kwang-Joo Choi, Kyungki-Do (KR)

(73) Assignee: LG Electronics, Inc., Seoul (KR)

( * ) Notice: Subject to any disclaimer, the term of this patent is extended or adjusted under 35 U.S.C. 154(b) by 541 days.

(21) Appl. No.: 09/983,747

(22) Filed: Oct. 25, 2001

(65) Prior Publication Data

US 2002/0072365 A1 Jun. 13, 2002

(30) Foreign Application Priority Data

Dec. 9, 2000 (KR) ......................................... 2000-74954

(51) Int. Cl.⁷ ............................................... H04Q 7/20
(52) U.S. Cl. .................... 455/432; 455/575.9; 455/561; 340/901; 340/905; 340/933; 340/539.26; 340/539.28; 340/286.02
(58) Field of Search ................................ 340/905, 901, 340/933, 539.26, 539.28, 286.02; 701/211, 1, 117; 455/11.1, 13.1, 73, 88, 556.1, 561, 562.1, 569.2, 575.9, 90.1, 432, 426.1

(56) References Cited

U.S. PATENT DOCUMENTS

| | | | | |
|---|---|---|---|---|
| 5,424,727 A | * | 6/1995 | Shieh ......................... | 340/928 |
| 5,602,919 A | * | 2/1997 | Hurta et al. .................. | 705/65 |
| 5,710,566 A | * | 1/1998 | Grabow et al. ............. | 340/10.2 |
| 5,910,782 A | * | 6/1999 | Schmitt et al. .......... | 340/995.12 |
| 6,356,207 B1 | * | 3/2002 | Oouchi ........................ | 340/928 |
| 6,417,781 B1 | * | 7/2002 | Matsumoto .................. | 340/901 |
| 6,470,261 B1 | * | 10/2002 | Ng et al. ...................... | 701/117 |
| 6,473,688 B2 | * | 10/2002 | Kohno et al. ................ | 701/117 |
| 2003/0045995 A1 | * | 3/2003 | Lee ............................. | 701/200 |

* cited by examiner

Primary Examiner—William Trost
Assistant Examiner—Marcos Torres
(74) Attorney, Agent, or Firm—Fleshner & Kim, LLP

(57) ABSTRACT

A transportation information system is disclosed, having a transportation terminal that transmits a transportation information request with a Dedicated Short Range Communication (DSRC) method, receives a transportation information reply corresponding to the transportation information request with the DSRC method, and provides the transportation information reply to a transportation subscriber. An Advanced Traveler Information Service (ATIS) terminal transmits a traveler information request with the DSRC method, receives a traveler information reply corresponding to the traveler information request with the DSRC method, and provides the traveler information reply to an ATIS subscriber. A base station communicates with the transportation terminal and the ATIS terminal through a two way DSRC communication. A transportation server classifies packets transmitted from the base station, through a dedicated network, by destination, performs a transportation service, and performs an ATIS service by interlocking with an ATIS server.

19 Claims, 4 Drawing Sheets

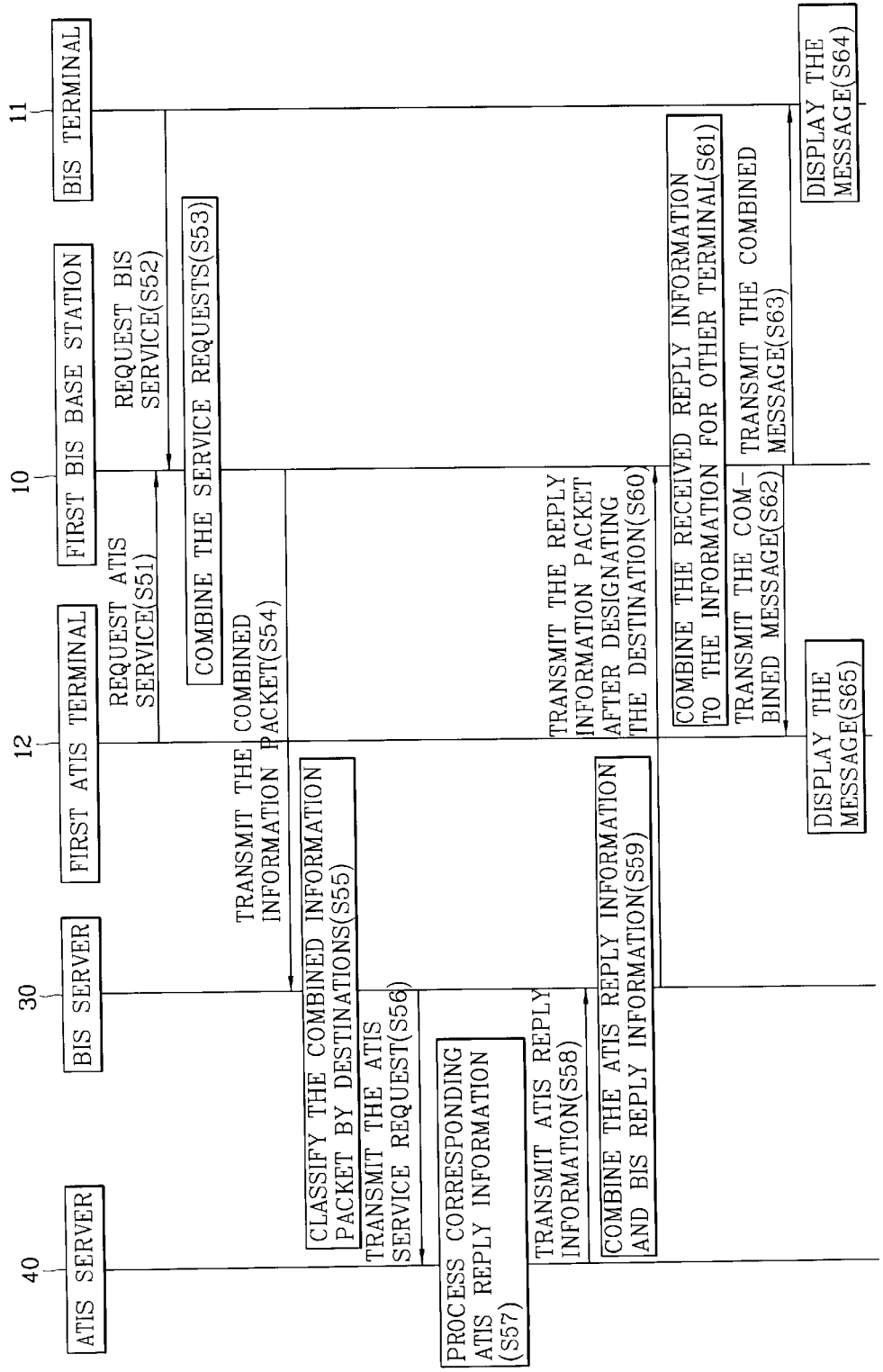

INFORMATION SYSTEM FOR A TRAVELER INFORMATION SERVICE AND METHOD FOR PROVIDING THE SERVICE

BACKGROUND OF THE INVENTION

1. Field of the Invention

The present invention relates to an information system, and more particularly, to a traveler information service.

2. Background of the Related Art

In general, a transportation information system provides information related to a vehicle service, such as route information of mass transportation and traffic state information of a particular route. Additionally, the system may provide information related to bus use, such as the route information of a particular transportation means, an arrival announcement of the particular transportation means, a vehicle dispatching interval, and transit information, to a customer using the mass transportation.

An Advanced Traveler Information Service (ATIS) system is a system differentiated from the above-described transportation information system. It provides information required for travel such as a mileage guide and parking information to a traveler.

Methods interlocking with various wireless communication methods are suggested for the above-described transportation information system or ATIS system to provide the service when the driver or mass transportation customer moves. The methods are divided into a service method interlocking with a Frequency Modulation-Data Radio Channel (FM-DARC) wireless communication method, a service method interlocking with a beacon wireless communication method, a service method interlocking with a cellular wireless communication method, and a service method interlocking with an International Mobile Telecommunication-2000 (IMT-2000) wireless communication method in the related art technology.

When the transportation information service or traveler information service is used with the FM-DARC wireless communication method, digital data is transmitted using the existing FM broadcasting channel. The digital transmission speed is limited to a maximum 16 Kbps rate and the communication cell volume is determined by the number of 16 Kbps channels. Accordingly, the implementation of a digital transceiver is easy by using wide area service and the existing broadcasting channel. However, because it uses the broadcast channel, it can perform only one-way service, which is limited to providing down links.

When the transportation information service or traveler information service method is used with the beacon wireless communication method, a two-way communication between a vehicle terminal and a roadside base station is possible. However, only one vehicle terminal may access a wireless channel at a time. A link setup to two vehicles using a single channel cannot be performed.

When the transportation information service or traveler information service method is used with the cellular wireless communication method, a circuit communication method provides both a voice service and the information service to the vehicle driver. Therefore, a terminal user has to maintain a continuous voice circuit to receive the information, thereby increasing the service expense.

A transportation information service or traveler information service method used with the IMT-2000 wireless communication method is capable of providing a packet data service besides the voice communication. However, the frequency of the communication channel varies in accordance with the particular service provided. Therefore, the subscriber terminal frequency has to be varied in accordance with the requested user service.

Accordingly, the transportation information system or traveler information service system adapting a DSRC method is suggested to provide the two-way communication. The adapted system provides an information analysis function, an information transmission function to a terminal, multiple connections to a plurality of terminals, a circuit data service, and a packet data service.

The DSRC method provides a two-way wireless communication method between a Road Side Equipment (RSC) (i.e., a DSRC base station) and an On-Board Equipment (OBE) (i.e., a DSRC terminal), using a 5.8 GHz frequency. Communication is possible when a vehicle having the DSRC terminal passes into a communication zone, formed by an antenna connected to the road side base station.

Because the transportation information system adapting the DSRC can not provide the ATIS service and the ATIS system adapting the DSRC can not provide the transportation information, the transportation information system adapting the DSRC and the ATIS system adapting the DSRC exist separately. Therefore, the construction expense and maintenance are duplicated when both systems are deployed.

SUMMARY OF THE INVENTION

An object of the invention is to solve at least the above problems and/or disadvantages and to provide at least the advantages described hereinafter.

An object of the present invention is to provide a transportation information system for a traveler information service. Another object is to provide a method for providing the service that is capable of improving the efficiency of a system. Still another object is to provide a system with various services. These objects are accomplished by owning each unit, constructing a DSRC method transportation information system jointly, and providing a traveler information service.

To achieve the above-mentioned objects, the transportation information system for the traveler information service comprises a transportation information terminal for transmitting a transportation information request signal with the DSRC method, receiving a reply corresponding to the request with the DSRC method, and providing it to a transportation information system subscriber; an ATIS terminal for transmitting a traveler information request signal with the DSRC method, receiving the reply corresponding to the request with the DSRC method, and providing it to the traveler information system (ATIS) subscriber; a transportation means use guide unit for transmitting the information request signal related to the transportation means use to the transportation information base station through a wire channel, receiving the reply corresponding to the request from the transportation information base station through a wire channel, and providing it to a customer using the transportation means; the transportation information base station for transmitting/receiving a packet to/from the transportation information terminal and ATIS terminal with the DSRC, and transmitting/receiving the packet to/from the transportation means use guide unit through a wire channel; and a transportation information server for classifying the packets transmitted from the transportation information base station through a transportation information system dedicated network by destinations, performing the transportation information service and performing the ATIS service by interlocking with an ATIS server.

In order to achieve the above-described objects, the traveler information service method of the transportation information system in accordance with the present invention comprises an ATIS service request information reception process for receiving the ATIS service request information transmitted from an ATIS terminal on a transportation information base station; an ATIS service request information transmission process for transmitting the received ATIS service request information as a packet format to a transportation information server; an ATIS service request process for transmitting the ATIS service request information from the transportation information server receiving the packet to the ATIS server; an ATIS service reply information generation process for generating the pertinent ATIS service reply information on the ATIS server receiving the ATIS service request information to the transportation information server; and an ATIS service reply information transmission process for transmitting the ATIS service reply information as a packet format from the transportation information server to the transportation information base station and transmitting the ATIS service reply information from the transportation information base station to the ATIS terminal with the DSRC method.

The objects of the invention may be further achieved in whole or in part by an information system, including a first server that provides a first service and has a second interface for communicating with a second server, which provides a second service; a base station that communicates with the first server and has a radio for communicating with a first terminal and a second terminal through a Dedicated Short Range Communication (DSRC) radio frequency (rf) protocol, wherein the base station combines a first communication from the first terminal with a second communication from the second terminal into combined upload message having a packet-based format and communicates the combined upload message to the second server, the first server communicates the first and second communications to their respective destinations selected from the group of the first server and the second server, based on a destination address in each of the first and second communications.

The objects of the invention may be further achieved in whole or in part by an information communication method, including communicating first information from a first terminal to a base station with a Dedicated Short Range Communication (DSRC) radio frequency protocol; communicating second information from a second terminal to the base station with the DSRC radio frequency protocol; combining the first and second information into a combined information, which has a packet format, and communicating the combined information to a first server; communicating the combined information from the first server to a destination selected from the group of the first server and a second server, based on a destination address in each of the first and second communication.

In order to achieve the above-mentioned objects, the traveler information service method of the transportation information system in accordance with the present invention comprises a transmitting process for generating a broadcast announcement message and transmitting it to a transportation information server when there is need to perform a broadcast announcement from an ATIS server to an ATIS terminal; a transmitting process for changing the broadcast announcement message into a packet format on the transportation information server in order to transmit it to the transportation information base station, designating a destination, and transmitting it to the transportation information base station through a system dedicated network; and a transmitting process for transmitting a broadcast announcement message from the transportation information base station to the ATIS terminal with the DSRC method.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 illustrates a flow chart of a method for providing service, in accordance with the preferred embodiment of the present invention, when a transportation information system subscriber and an ATIS subscriber request the service at the same time.

DETAILED DESCRIPTION OF PREFERRED EMBODIMENTS

A DSRC method Bus Information System (BIS) for an ATIS service will be described with reference to the accompanying drawings. The BIS provides information related to a bus service and bus use to a user.

Figure 1:
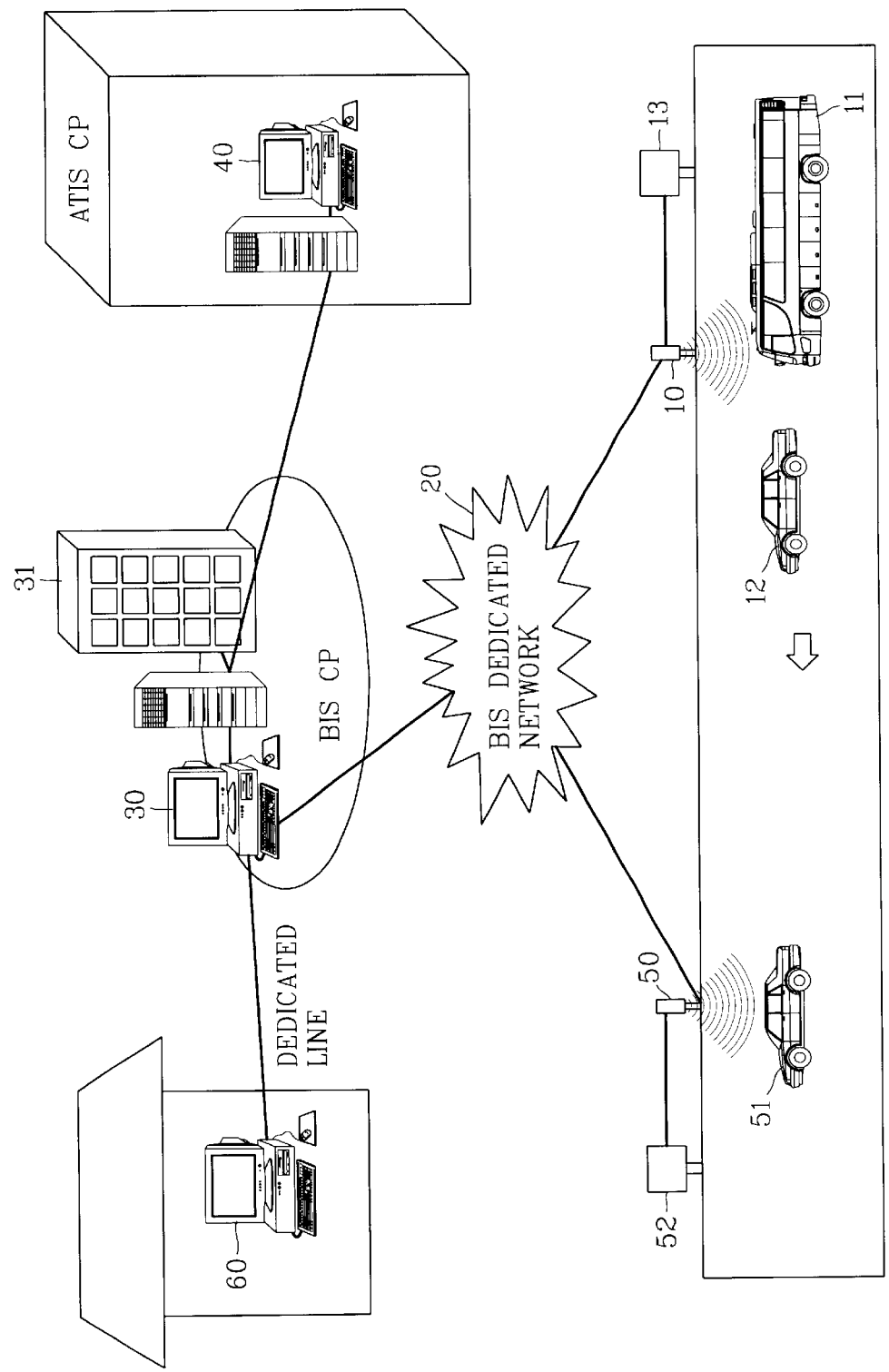
FIG. 1 illustrates a construction profile of a DSRC method transportation information system for a traveler information service in accordance with the preferred embodiment of the present invention.

FIG. 1 is a construction profile illustrating a DSRC method transportation information system for the ATIS service. The BIS for the ATIS service comprises a BIS terminal 11, ATIS terminals 12, 51, a first BIS station 10, a first bus stop guide unit 13, a second BIS base station 50, a second bus stop guide unit 52, a BIS dedicated network 20, a BIS server 30, a BIS center 31, an ATIS server 40, and a bus control terminal 60. The first BIS base station 10, second BIS base station 50, BIS server 30, BIS center 31, first and second bus stop guide units 13, 52 etc. provide the transportation information service. The transportation information base station, transportation information server, transportation information center, transportation mean use guide unit, transportation control terminal are referred to, in conjunction with bus related information services, as a BIS base station, a BIS server, a BIS center, a bus stop guide unit, and a bus control terminal, respectively. Similarly, the transportation information terminal for requesting the transportation information service and providing the transportation information service to the transportation information system subscriber is referred to as a BIS terminal, when used with respect to a bus related information service.

The BIS terminal 11 sends a BIS service request to the first BIS base station 10, using the DSRC method, and receives the request BIS service reply from the first BIS base station 10. The ATIS terminal 12 sends the ATIS service request to the first BIS base station 10, using the DSRC method, and receives the request ATIS service reply from the first BIS base station 10.

The first and second BIS base stations 10, 50 provide the pertinent service to the pertinent terminal by separately performing DSRC communications with the BIS terminal 11 and ATIS terminals 12, 51.

The first and second bus stop guide units 13, 52 request information related to the bus use from the pertinent BIS base stations 10, 50 by wire communication, receive the information related to the bus use transmitted from the pertinent BIS base stations 10, 50, and display it.

The BIS dedicated network 20 connects the first and second BIS base stations 10, 50 and BIS server 30 through a leased line. The BIS server 30 is connected to the first and second BIS base stations 10, 50, the BIS center 31, an ATIS server 40 and a bus control terminal 60. This BIS server 30 classifies received data by destination and transmits the data to the identified destination. Additionally, the interconnection of the ATIS server 40 with the BIS server 30 allows the latter device to provide the integrated BIS service and ATIS service. The BIS center 31 collects information related to the BIS and ATIS, manages it, and processes it. The ATIS server 40 transmits a broadcast announcement, to be transmitted to the first and second ATIS terminals 12, 51, to the BIS server 30. Also, the ATIS server 40 provides ATIS service in accordance with an ATIS service request forwarded by the BIS server 30. The bus control terminal 60 controls the bus service in accordance with the control of a BIS operator.

Figure 2:
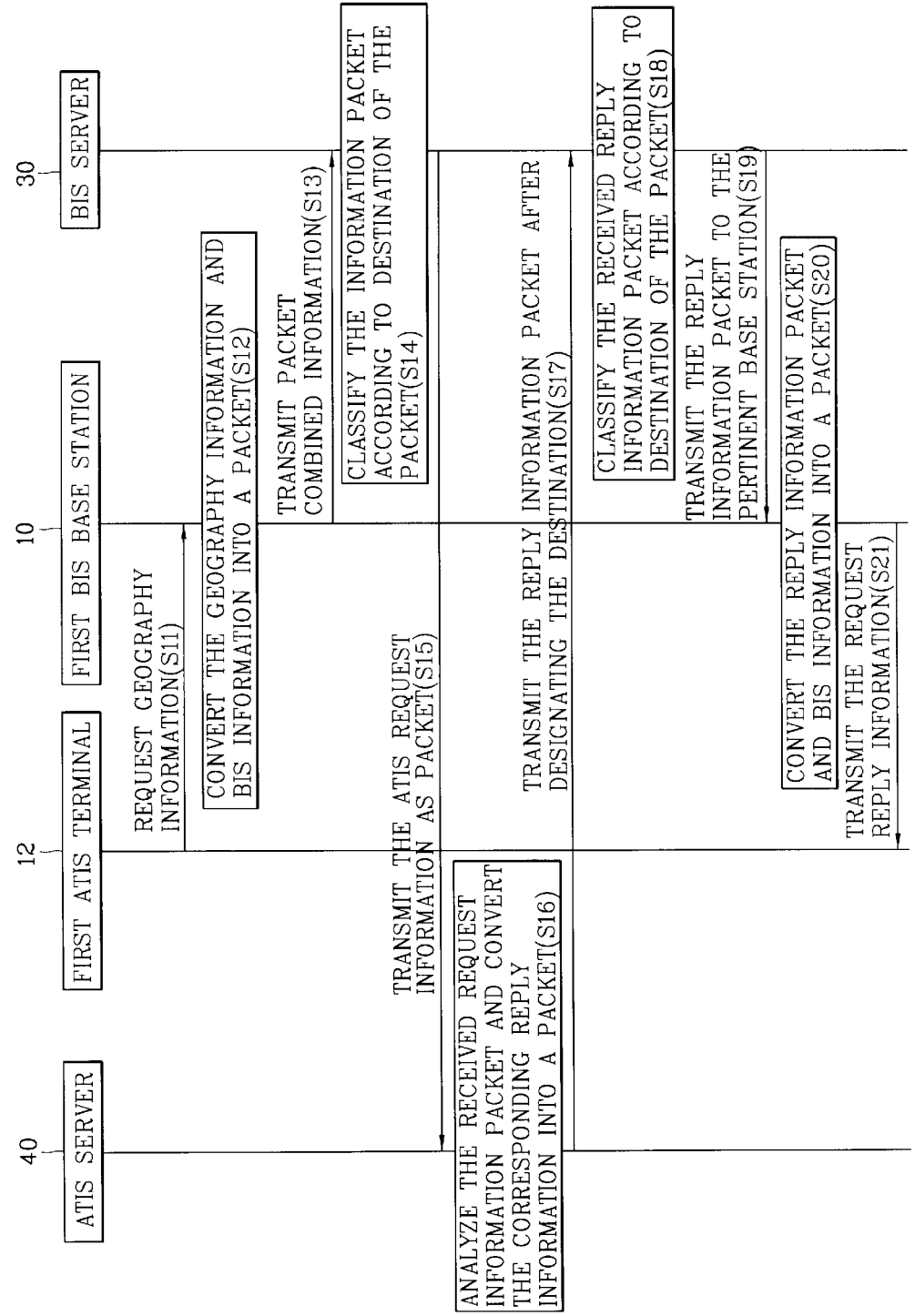
FIG. 2 illustrates a flow chart of an ATIS service method of a transportation information system, in accordance with the preferred embodiment of the present invention, when an ATIS service is requested from an ATIS service subscriber.

FIG. 2 is a flow chart illustrating the BIS service method regarding the ATIS service request from the ATIS service subscriber. When the ATIS subscriber transmits the ATIS service request information, such as a geography information request, to the first BIS base station 10 through the first terminal 12 S11, the first BIS base station 10 combines the request information of the BIS service with the ATIS service request information. The combined BIS service request information and ATIS service request information are converted into a packet format for transmission to the BIS server 30 S12. The first base station 10 transmits the converted packet to the BIS server 30 through the dedicated network 20 S13.

The BIS server 30 classifies the received packet by its destination S14. When the information of the received packet is the information requesting the ATIS service, the BIS server 30 transmits the ATIS service request information to the ATIS server 40 S15. The ATIS server 40 analyzes the received ATIS service request information, converts the pertinent reply information into a packet format, and transmits the packet to the BIS server 30 by designating the BIS base station 10 as the destination S16, S17.

The BIS server 30 determines the destination of the received reply information, in this case the first BIS base station 10, and transmits it to the destination S18, S19. The first BIS base station 10 combines the BIS information and reply information and converts it into a packet format to transmit to the first ATIS terminal 12 S20. The first BIS base station 10 transmits the packet reply information with the DSRC method S21. First ATIS terminal 12 receives the packet of reply information and displays the information to the ATIS subscriber.

In summary, the ATIS terminal requests the ATIS service through the BIS base station and receives the ATIS service information from the BIS server. Accordingly, the ATIS service can be provided to the ATIS terminal through the BIS system.

Figure 3:
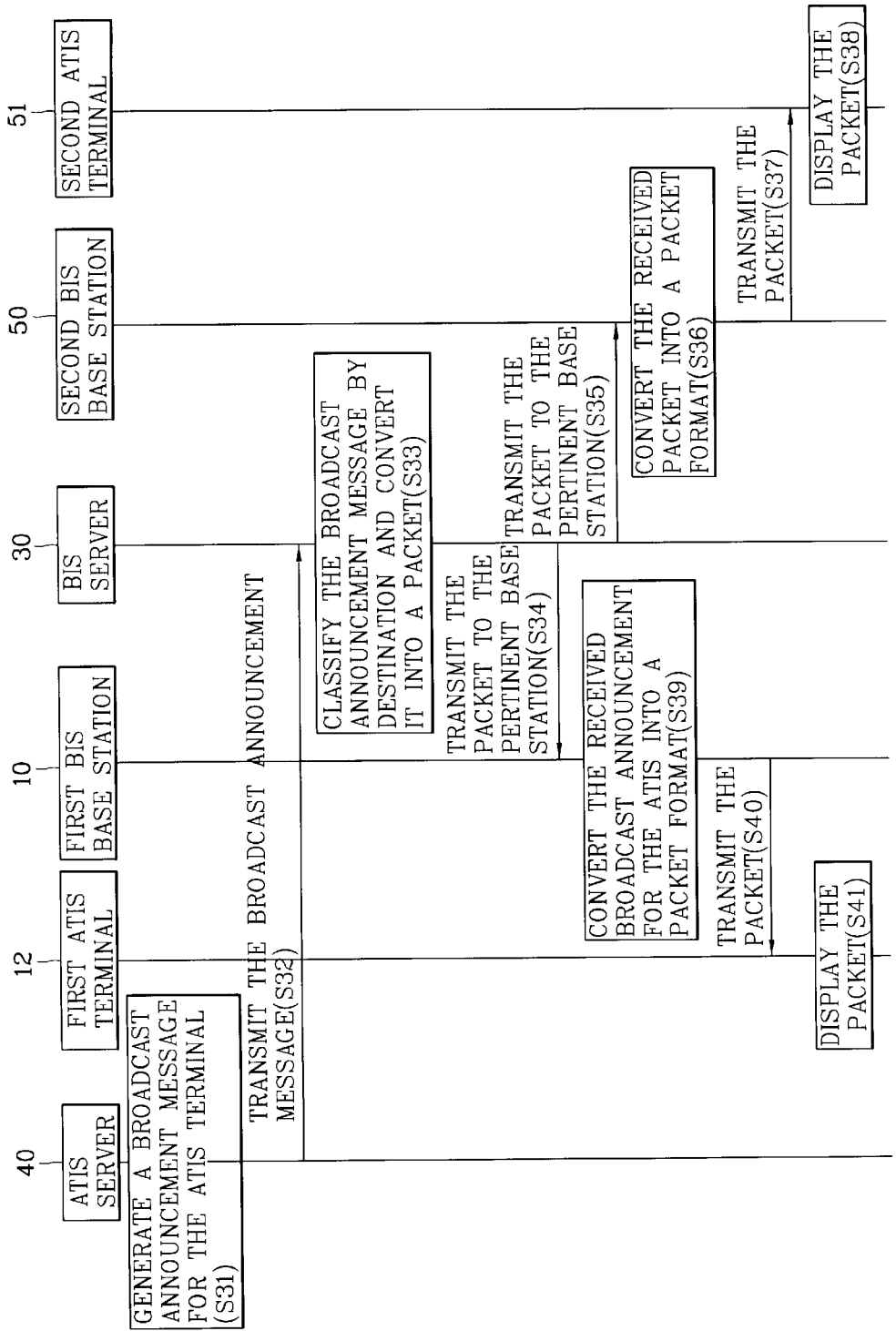
FIG. 3 illustrates a flow chart of a method for providing a broadcast announcement service to an ATIS terminal through a transportation information server, in accordance with the preferred embodiment of the present invention.

FIG. 3 is a flow chart illustrating a method for providing a broadcast announcement service to an ATIS terminal through a transportation information server. When there is a need to perform a broadcast announcement from the ATIS server 40 to the ATIS terminals 12, 51, the broadcast announcement message is converted S31 and transmitted to the BIS server 30 S32.

The BIS server 30 classifies the received ATIS broadcast announcement message by its destination and converts the message into a packet format to transmit it to the BIS dedicated network 20 S33. The BIS server 30 transmits the ATIS broadcast announcement message having the packet format to the pertinent BIS base stations 10, 50 through the BIS dedicated network 20 S34, S35.

When the second BIS base station 50 receives the ATIS broadcast announcement message, it converts the received message into a packet format in order to transmit it with the DSRC method. Then, BIS base station 50 transmits the DSRC packetized message to the second ATIS terminal 51 S36, S37. The second ATIS terminal 51 receives the broadcast announcement packet through the DSRC channel and displays it on an LCD S38.

In addition, the first ATIS terminal 12 receives the ATIS broadcast announcement message in a similar manner from the first BIS base station 10 and displays the message on its LCD S39~S41.

FIG. 4 is a flow chart illustrating a method for providing service when a transportation information system subscriber and an ATIS subscriber request service at the same time. When the BIS terminal 11 and first ATIS terminal 12, which are both in the communication zone of the first BIS base station 10, both send a service request to the first BIS base station 10 at the same time S51, S52, the first BIS base station receives the BIS request information from the BIS terminal 11 and the ATIS request information from the first ATIS terminal 12. The first BIS base station 10 combines the received BIS service request information and the ATIS request information, converts the combined information into a packet format to transmit it to the BIS server 30 S53, and transmits the packetized information to the BIS server 30 through the BIS dedicated network 20 S54.

The BIS server 30 classifies the received packet by its destination, processes a reply to the BIS service request information, and transmits the ATIS service request to the ATIS server 40 S55, S56. The ATIS server 40 processes a reply data corresponding to the ATIS service request and transmits the reply to the BIS server 30 S57, S58. The BIS server 30 combines the BIS reply information processed in accordance with the BIS service request and the ATIS service reply information received from the ATIS server 40 and transmits the combined reply information to the first BIS base station 10, by designating its destination address S59, S60.

The first BIS base station 10 communicates the combined reply information to both the first BIS terminal 11 and the first ATIS terminal 12 S61, S62, S63. Any other messages waiting to be communicated to other terminals within the communication zone of first BIS base station 10 are packetized into a message stream with the combined reply information before being communicated by the first BIS base station 10. The BIS terminal 11 receives the BIS service reply information and the first ATIS terminal 12 receives the ATIS service reply information S64, S65.

The BIS terminal performs the two way DSRC communication using its own power transmission function. The ATIS terminal also performs the two way DSRC communication with the BIS base station using its own power transmission function. Therefore, the BIS system can provide the BIS service and ATIS service.

Communication between the BIS base station and the terminals (i.e., ATIS terminals and BIS terminals) is performed with a Time Division Multiple Access (TDMA) method. When there is one DSRC channel and it is constructed with a plurality of time slots having a certain length, the second time slot, fourth time slot, sixth time slot etc. are used when the information is transmitted from the BIS base station to the terminal. The third time slot, fifth time slot, seventh time slot are used when the information is transmitted from the terminal to the BIS base station. The first time slot is used as preamble.

The first bus stop guide unit 13 sends a request for a certain bus use guide to the first BIS base station 10, in accordance with the control of a customer waiting for the bus. When the first BIS base station 10 receives the bus use guide request information, from the first bus stop guide unit 13, it converts the bus use request information and any other request information transmitted from the other terminals into a packet format and transmits the packet to the BIS server 30. Communication between the BIS base station 10, 50 and the bus stop guide 13, 52 is conducted by wired communication.

BIS server 30 processes reply information in accordance with the bus use guide request information and transmits the reply information to the first BIS base station 10. The first BIS base station 10 classifies the packet received from the BIS server 30 by its destination. When the destination is the first bus stop guide unit 13, the first BIS base station 10 formats the reply information into a message to be transmitted with the wire communication method and transmits it to the first bus stop guide unit 13. When the destination is not the first bus stop guide unit 13, the first BIS base station 10 converts the reply information into a format to be transmitted by DSRC and transmits it to the pertinent terminal.

Accordingly, the network construction can be simplified by connecting the BIS base station and bus stop guide unit with wire and communicating information between the BIS sever and the bus stop guide unit through the BIS base station. By comparison, a related art network construction connects the bus stop guide unit directly to the BIS server, through a modem.

The present invention can be adapted to an Advanced Traffic Management System (ATMS) service, an Advanced Vehicle Control System (AVCS) service, an Advanced Public Transportation System (APTS) system, and a Commercial Vehicle Operation (CVO) service.

The invention is capable of providing multiple services by using one transportation information base station to perform the two way DSRC communication with the transportation information terminals, the ATIS terminals, and the bus stop guide unit. The present invention is capable of performing the ATIS service, on the transportation information system, by performing two way DSRC communication with the ATIS terminal, using the transportation information base station, and sending an ATIS service request to the ATIS server, after linking the transportation information server with the ATIS server.

In addition, the invention connects the transportation information base station and bus stop guide unit by wired communication to communicate the information on the transportation information base station with the bus stop guide unit. Therefore, an additional channel for connecting the transportation information server directly to the bus stop guide unit is not required.

Also, the load for the data processing is distributed and the processing reply speed improves by constructing separately the transportation information server performing the transportation information service and the ATIS server performing the ATIS service.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A transportation information system, comprising:
 a transportation terminal that transmits a transportation information request using a Dedicated Short Range Communication (DSRC) method, receives a transportation information reply corresponding to the transportation information request using the DSRC method, and provides the transportation information reply to a transportation subscriber;
 an Advanced Traveler Information Service (ATIS) terminal that transmits a traveler information request using the DSRC method, receives a traveler information reply corresponding to the traveler information request using the DSRC method, and provides the traveler information reply to an ATIS subscriber;
 a base station that communicates with the transportation terminal and the ATIS terminal through a two way DSRC communication; and
 a transportation server that classifies packets transmitted from the base station, through a dedicated network, by destination, performs a transportation service, and performs an ATIS service by interlocking with an ATIS server.

2. The system of claim 1, wherein the ATIS server transmits a broadcast announcement, to be transmitted to the ATIS terminal, to the transportation server and processes the traveler information reply, when the ATIS service is requested.

3. The system of claim 1, further comprising a transportation information center that collects and manages information related to the base station and the ATIS terminal.

4. The system of claim 1, further comprising a transportation control terminal that controls an operation of a transportation system in accordance with a control of a system operator.

5. The system of claim 1, further comprising a transportation guide unit that transmits first information related to a use of the transportation system to the base station through a wire channel, receives second information related to the use of the transportation system from the base station through the wire channel, and displays the second information.

6. The system of claim 1, further comprising:
 a transportation guide unit that transmits a guide information request to the base station through a wire channel, receives a guide information reply corresponding to the guide information request from the base station through the wire channel, and provides the guide information reply to a customer, wherein
 the base station communicates the packets with the transportation terminal and the ATIS terminal using the DSRC method and communicates the packets with the transportation guide unit through the wire channel.

7. A traveler information service method, comprising:

receiving an Advanced Traveler Information Service (ATIS) service request transmitted from an ATIS terminal to a base station;

transmitting the received ATIS service request in a packet format to a transportation information server;

transmitting the ATIS service request from the transportation information server to an ATIS server;

transmitting an ATIS service reply from the ATIS server to the transportation information server; and transmitting the ATIS service reply in the packet format from the transportation information server to the base station and transmitting the ATIS service reply from the base station to the ATIS terminal using a dedicated short range communication (DSRC) method.

8. The method of claim 7, wherein a transportation guide unit transmits a guide request to the base station by a wire channel.

9. The method of claim 7, wherein the base station combines the ATIS service request and a transportation information service request into a combined request and converts the combined request into combined packets of the packet format to be transmitted to the transportation information server, when the ATIS service request and the transportation information service request are received by the base station at approximately the same time.

10. The method of claim 8, wherein the guide request is combined with the ATIS service request into a combined request and the combined request is converted into combined packets of the packet format.

11. The method of claim 7, wherein the transportation information server classifies the packet received from the base station by destination and transmits the ATIS service request to the ATIS server when the ATIS server is the destination.

12. The method of claim 11, wherein the base station combines the ATIS service request and a transportation information service request into a combined request and converts the combined request into combined packets of the packet format to be transmitted to the transportation information server, when the ATIS service request and the transportation information service request are received by the base station at approximately the same time; and the transportation information server generates a transportation information reply if the packet has the destination of the transportation information server.

13. The method of claim 12, wherein the transportation information server combines the transportation information reply and the ATIS service reply into a combined reply and converts the combined reply into the combined packets for transmission to the base station.

14. The method of claim 8, wherein the ATIS service reply information transmission process comprises:

generating combined packets of the packet format to be transmitted to the base station by combining a transportation information reply, generated by the transportation information server, and the ATIS reply;

classifying each packet of the combined packets as the ATIS service reply, the transportation information reply, or a guide reply, generated by the transportation information server in accordance with the guide request, when the base station receives the combined packets from the transportation information server; and transmitting the ATIS service reply and the transportation information reply using the DSRC method and transmitting the guide reply to the transportation guide unit through the wire channel.

15. The method of claim 7, wherein the base station and the ATIS terminal communicate with a Time Division Multiple Access (TDMA) method.

16. The method of claim 15, wherein the ATIS terminal transmits first information in even number time slots of a TDMA frame and the base station transmits second information in odd number time slots of the TDMA frame, excluding a first time slot used as a preamble.

17. A traveler information service method, comprising:

transmitting a broadcast announcement message from an Advanced Traveler Information System (ATIS) server to a transportation information server;

transmitting the broadcast announcement message in a packet format from the transportation information server to a base station designated in the packet format, through a dedicated network; and transmitting the broadcast announcement message from the base station to an ATIS terminal using a Dedicated Short Range Communication (DSRC) method.

18. An information system, comprising:

a first server that provides a first service and has a second interface for communicating with a second server, which provides a second service;

a base station that communicates with the first server and has a radio for communicating with a first terminal and a second terminal through a Dedicated Short Range Communication (DSRC) radio frequency (rf) protocol, wherein the base station combines a first communication from the first terminal with a second communication from the second terminal into a combined upload message having a packet-based format and communicates the combined upload message to the first server, the first server communicates the first and second communications to their respective destinations selected from the first server and the second server, based on a destination address in each of the first and second communications.

19. An information communication method, comprising:

communicating first information from a first terminal to a base station with a Dedicated Short Range Communication (DSRC) radio frequency protocol;

communicating second information from a second terminal to the base station with the DSRC radio frequency protocol;

combining the first and second information into combined information, which has a packet format, and communicating the combined information to a first server;

communicating the first and second information from the first server to a destination selected from the first server and a second server, based on a destination address in each of the first and second communications.

* * * * *